March 9, 1954  E. E. LINDSEY  2,671,646
MEANS FOR FREEZING LIQUIDS
Filed Jan. 16, 1952  2 Sheets-Sheet 1
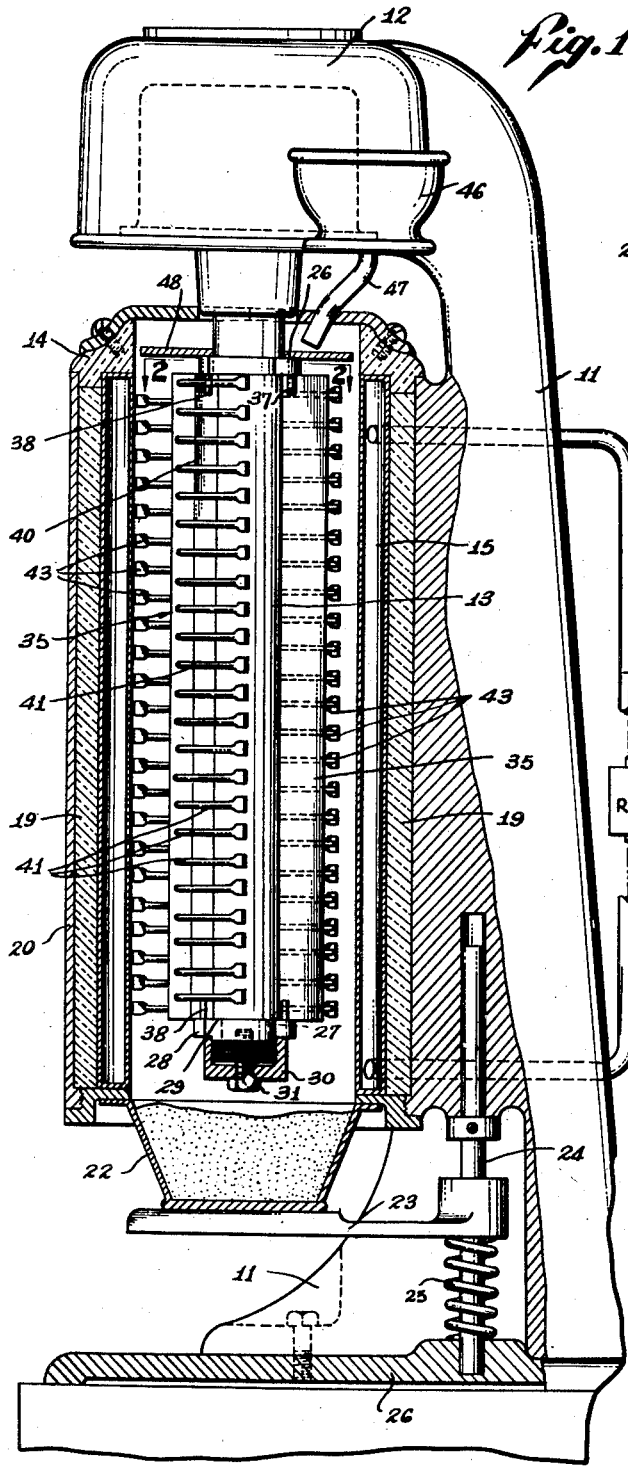
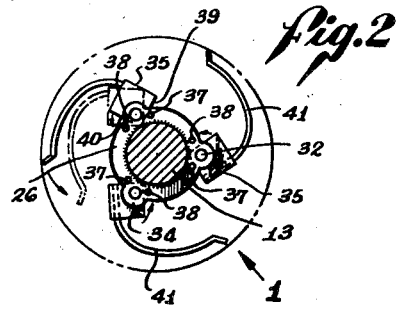
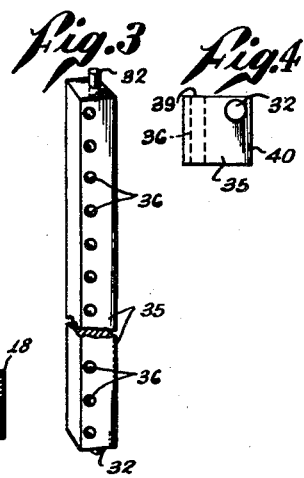
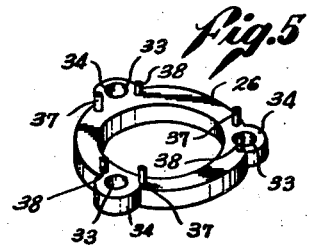
INVENTOR.
ERNEST E. LINDSEY
BY George R. Bliss
ATTORNEY March 9, 1954  E. E. LINDSEY  2,671,646
MEANS FOR FREEZING LIQUIDS
Filed Jan. 16, 1952  2 Sheets-Sheet 2
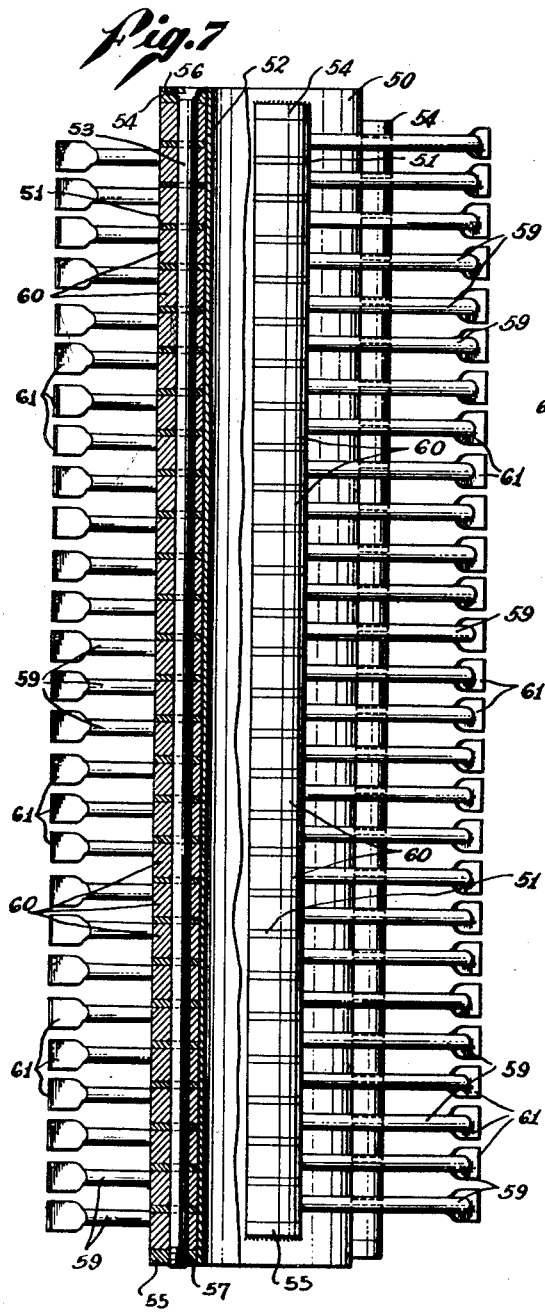
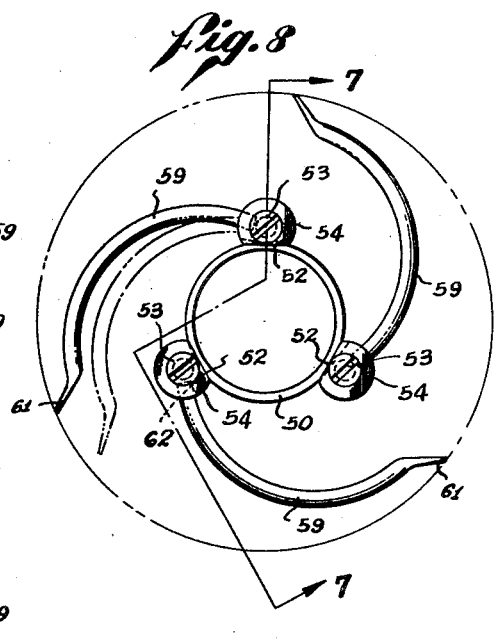
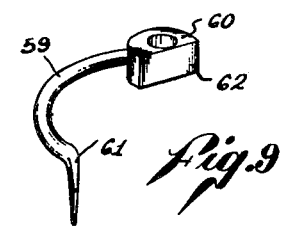
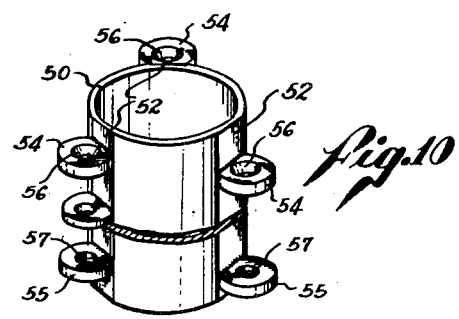
INVENTOR.
ERNEST E. LINDSEY
BY George R. Bliss
ATTORNEY

Patented Mar. 9, 1954

2,671,646

UNITED STATES PATENT OFFICE 2,671,646

MEANS FOR FREEZING LIQUIDS

Ernest E. Lindsey, Los Angeles, Calif.

Application January 16, 1952, Serial No. 266,760

11 Claims. (Cl. 259—24)

My invention relates to a means of freezing liquids, and more particularly, to a means of freezing and chilling confection mixtures at high speed and with a minimum grain size.

Among the objects of my invention are: To provide a means of freezing liquids such as a confection mixture at high speed; to provide a means of making frozen confections at high speed and of superior quality; to provide a means of quick freezing a confection in individual units; to provide a quick freezing device operating with a minimum of chatter and vibration; to provide a means of scraping frozen material from a refrigerated surface with a minimum of chatter and vibration; to provide a means of producing a fine grained frozen confection either continuously or in indivdual units; to provide an improved means of applying and removing a liquid material such as a confection mixture, to and from a refrigerated surface; and to provide improved means of introducing a liquid material into a chamber having a refrigerated surface and distributing it in the chamber and over the surface.

My invention possesses numerous other objects and features of advantage, some of which, together with the foregoing, will be set forth in the following description of specific apparatus.

Figure 1 is a longitudinal view partly in section and partly in elevation of a preferred form of my invention, taken in the direction of the arrow 1 in Figure 2;

Figure 2 is a section view taken as indicated by the line 2—2 in Figure 1;

Figure 3 is an elevational view of a finger-mounting rod;

Figure 4 is an enlarged top plan view of this rod;

Figure 5 is a bottom plan view of the upper rod mounting collar;

Figure 6 is a perspective view of one of the fingers;

Figure 7 is an elevational sectional view taken along the line 7—7 of Figure 8, showing a modified form of the rotating finger assembly;

Figure 8 is a plan view of the assembly shown in Figure 7;

Figure 9 is a perspective view of one of the fingers shown in Figures 7 and 8; and Figure 10 is a perspective view of the shaft tubing of Figures 7 and 8, with the middle portion broken away.

Referring directly to the figures of the drawing, for a more detailed description of my invention, frame 11 is provided, carrying at the top a motor 12 having a central shaft 13 extending downwardly. Surrounding and concentric with shaft 13 is a hollow cylinder 14, provided, by any suitable construction, with a chamber 15 through which a refrigerating fluid may be circulated by pipes 16 and 17 from a refrigeration system 18. Precooled brine may be circulated, or if desired, a volatile liquid may be allowed to expand in chamber 15, and thus cool the cylinder 14 by abstraction of heat during the expansion of said liquid, as is customary with refrigeration units. Cylinder 14 is surrounded by a layer of heat insulating material 19, this insulating material being held in place by cylindrical outer cover 20, the latter being attached along the central line to frame 11. At the bottom of cylinder 14 is positioned a confection receptacle 22 mounted on a swinging arm 23, the latter being pivoted on an upright pin 24 so that receptacle 22 may be placed on arm 23 to close the bottom of the cylinder 14, the arm 23 being forced upwardly by spring 25. Frame 11 is preferably supported in a vertical position by a removable base 26. It will be understood that the frozen or chilled product may be withdrawn through an apertured and valved plate at the lower end of the cylinder in lieu of the receptacle 22, if desired.

The shaft 13 has rigidly secured to it as by silver soldering, an upper collar 26, shown in inverted position in Figure 5. The lower end of the shaft has a portion 27 of reduced diameter. A lower collar 28 is sleeved upon this end of the shaft and is held in position against the shoulder 29 of the shaft by a nut 30 threaded over a reduced lower end of the collar, and the nut and collar are held in position against the shoulder 29 by a cap screw 31, threaded into the end portion 27 of the shaft.

A plurality of rods 35, preferably three, of rectangular section, are provided at their ends with pins 32 which during assembly are received by three circumferentially spaced holes 33 in ears 34 formed on each of the collars 26 and 28. Each pin 32 and hole 33 at one end is aligned with a pin and hole at the other end. Each of the rods 35 has drilled therein a plurality of horizontal holes 36. Preferably these holes are arranged in a single plane which is parallel to the axis of the rod, adjacent one of the side faces thereof, and remote from the axis of the pins 32, which are preferably disposed near one of the corner edges of the rod. Each collar has three movement-limiting pins 37 arranged adjacent to the three holes 33, respectively, and clockwise in advance of these holes, and three movement-limiting stop pins 38 adjacently in advance counter-clockwise of the holes 33 respectively. These pins 37 and 38 engage the side walls 39 and 40, respectively, of the three rods 35, permitting the rods to oscillate on the pins 32 seated in the holes 33, over similar limited arcs.

The fingers 41 are made of substantially inflexible and non-resilient metal. Each finger has a pin portion 42 which is seated within one of the holes 26 of the rods 35, a terminal blade 43 and an outwardly and rearwardly curved arm 44 connecting the pin portion and the blade. This arm maintains the pin and blade in a fixed relative position with respect to each other. Because of its inflexible character it will not permit appreciable elastic movement of the blade with respect to the pin portion 42 under the stresses of normal operation of the apparatus. The blade is preferably, but not necessarily curved as shown in the drawing.

The blades are preferably flat with their planes inclined outwardly and rotatively rearwardly with respect to the inner surface of the cylinder 14. The scraping edge 45 of this blade is adjacent or very lightly touches the cylinder wall, preferred spacing being from .000 to .0010 inch, and the blades 43 are preferably twisted with respect to the axis of the cylinder so that the blades are at an angle to the vertical.

When the motor is started, the fingers move outwardly under the action of centrifugal force, the rods 35 turning until they are stopped by stop pins 37. In this position the blades 43 of each gang of fingers on a rod 35 are in their operative position just short of contact or in light contact with the inner surface of the cylinder, and are not permitted to move into a pressure contact with that surface. When the motor stops, the arms are free to move back in three gangs with their rods until the blades are spaced substantially from the cylinder wall, the rods being free to turn until stopped by pins 38.

The cylinder wall may be refrigerated to any desired temperature depending upon the hardness of the confection it is desired to deliver to container 22. With the motor 12 rotating the blade assembly at high speed, the confection is poured into funnel 46 running therefrom through delivery pipe 47 onto a whirling distributor disk 48 rigidly carried by shaft 13. The confection is hurled outwardly, strikes the inner surface of the cylinder 14, and moves downward by gravity, into the path of the rotating blades at the top of the cylinder. The material is then very finely broken up by the impact of the blades and is thrown against the refrigerated surface whereon it freezes substantially instantaneously. As soon, however, as the layer of frozen material builds up beyond the spacing of the scraping edges from the cylinder wall, or immediately, if the pins 37 are set to permit a very light contact of the scraping edges with the cylinder wall, the frozen material is scraped off by the scraping edges 45, and is still further finely divided by impact and thrown again onto the cylinder wall for additional freezing. Simultaneously, the blades 43 are directing the material downwardly through the cylinder, aided by gravity, and in a very few seconds, the entire amount of liquid material poured into funnel 46 is delivered to the container 22 as a frozen confection, the consistency of which will depend on freezing temperatures and speed of motor rotation.

The distributor disk 48 serves an important purpose especially in the treatment of relatively thick, heavy and viscous liquids, which is explained as follows. The liquid confections should be distributed evenly around the circumference of the freezing cylinder to obtain the maximum use of the beater blades at the upper end of the machine. Accordingly, the orifice of the delivery pipe 47 should be near the axis of the machine, allowing the rapidly moving rotating structure to catch it and whirl it outwardly, before it begins its downward travel. But if the distributor disk 48 is not provided as a part of the rotating structure, the confection, particularly, if it is of a heavy thick consistency, tends to adhere to the inner portions of the fingers and some of it may work inwardly toward the central parts of the rotating structure. The disk 48 prevents this, for it evenly distributes the confection over the inner wall of the freezing cylinder, before it begins its descent, and when it is engaged by the beater and scraper blades, it is held by centrifugal force close to the cylinder wall, where the freezing, beating and comminuting action is at a maximum.

Irrespective of consistency, however, the frozen material will be of exceedingly fine grain due to the intensive beating action taking place during the progression of the material through the cylinder, and due to the fact that the material, after being deposited on the wall to be frozen, is instantaneously or almost instantaneously removed therefrom, thus preventing a formation of ice crystals of any considerable size. It will be obvious, however, if the pins 37 are set for a slight spacing of the edges from the cylinder wall, that there will be formed on the cylinder wall a skin of hard frozen material between the scraping edges 45 and the refrigerated surface, the thickness of this skin being determined of course by the spacing of the scraping edges from the cylinder walls. Once built up, this skin does not enter into subsequent material during freezing thereof and provides a freezing surface exactly registering with the scraping edges.

One of the greatest problems in the design of an apparatus of this kind is the elimination of chatter and vibration which may be not only annoying but destructive. In my Patent No. 2,272,715, I disclosed an apparatus designed to eliminate this chatter and vibration which was characterized by fingers in which the scraper beater blades were connected to the shaft by an arm of resilient metal, which was rigidly connected at its inner end to the shaft. While this expedient was a great improvement over machines of former design, the apparatus of this invention provides an alternative expedient for eliminating this chatter and vibration which admits of a simpler, sturdier construction and is under some circumstances more effective in providing quiet, smooth operation. The fingers being inflexible are less subject to crystallization from fatigue.

The fingers of this present invention while rigid and inflexible from blade end to shaft end are pivotally mounted with respect to the shaft on their respective rods 35 and each gang is movable as a rigid whole on its pivot mounting, toward and away from the shaft axis. Each finger is acted upon by the centrifugal force of the mass of the entire gang of fingers. Then, as a film of frozen material appears, or builds up on the inner wall of the cylinder and reaches its allowable maximum thickness, the blades are centrifugally forced against the film, scraping it and preventing further accumulation. If, however, the film momentarily thickens under a given blade, that blade and the other blades of that gang are permitted to back off in opposition to the centrifugal force of the gang which tends to return them and keep them in contact with the film. No bending of the finger arm occurs, the movement of the finger being a swing as a rigid whole toward and away from the surface of the frozen film. I find that this construction results in an almost total lack of vibration and chatter in the apparatus.

When, after a period of operation, the motor stops, the blades are free to move away from the cylinder wall, and they do so naturally without provision of springs or other retracting agent, due to the centripetal action of the mass of the decelerating rotatable structure.

It will also be noted by reference to Figure 6 that I have expanded the vertical dimensions of the blades 43 carrying the scraping edges 45. This is done for two reasons. I increase the length of the scraping edges so that their paths overlap. Thus all portions of the cylinder wall will surely be scraped, preventing any accumulation of frozen material thereon. The use of the expanded blades also provides efficient propeller action to force the material to the lower end of the device without unduly enlarging the arms which of course, should be kept small so that frozen material will not accumulate thereon.

Figures 7, 8, 9 and 10 show a form of the rotatable structure of this invention in which the fingers are mounted for independent movement of each finger with respect to all of the other fingers. In this form of the rotatable structure, each finger is moved toward the cylinder wall by the centrifugal force of its own mass only. While in this form of the invention the advantage of having the centrifugal force of the mass of an entire gang acting upon each finger is lacking, another advantage is gained. Each scraping edge is free to move to the furthermost outward position permitted by its individual stop, as will presently appear, and thus each finger is always in contact with the frozen confection and therefore functions independently at all times to scrape frozen confection from the cylinder wall. Which form of the invention should be used depends upon the nature of the confection liquid, the type of freezing medium, and other characteristics of the equipment and the work material. In general, if conditions are such that a layer of frozen hard, densely compacted confection tends to build up rapidly, the form of the invention shown in Figures 1 to 6 should be used, since the centrifugal force acting on each finger is relatively large. If the reverse is true, the second form of the invention may be used, and the liquid more rapidly frozen and beaten into a fine grained homogenous mass.

In Figures 7 and 8, the rotatable structure upon which the fingers are mounted is shown to comprise, first, a steel tube 50 preferably of stainless steel, corresponding to the shaft 13 of Figure 1, second, a plurality, preferably three vertically aligned rows of outwardly projecting horizontal washers 51, fixedly secured to the tube 50 at spaced intervals along flat faces 52 formed on the tube 50, and third, a vertical rod 53 for each row of washers, secured at each end to the proximate end of one of the washers. These end washers are somewhat thicker than the intermediate washers in a row thereof, and function as rod supports as well as end washers.

The upper three end washers 54 have countersunk holes 56 and the lower three end washers 55 have threaded holes 57. Each rod 53 has a screw head at its upper end which is seated in the countersunk hole 56, and a threaded portion at its lower end for engagement with the threaded hole 57. The fingers 58 each have an outwardly spirally curved shank 59, a hub 60 at the inner end of the shank and a scraping and beating blade 61 at the outer end of the shank. They are made, like the fingers in the first described form of the invention, of a substantially inflexible, nonresilient material, which prevents motion of the blade relative to the hub, the entire finger moving as one rigid assembly.

Each hub has a central hole through which the rod passes, providing a pivotal connection between the finger and the rotatable structure. Each hub 60 has a flat face 62, opposite the adjacent face 52 on the tube 50, and spaced slightly outwardly therefrom. Each finger is thus permitted to rock in a horizontal plane about the pivotal axis of the rod 53 over a small arc, limited in each direction as an end of the face 62 contacts the face 52. At one limit of movement the scraping edge of the blade 61 is slightly spaced or barely contacting the inner surface of the cylinder containing the freezing medium, and at the other limit of movement it is relatively remote from this inner surface.

The rods 53 are equally spaced angularly about the center of the tube 50, and in the drawings three rods are shown spaced at 120 degree intervals. Each hub is rotatably seated between two washers 51. The washers of each vertical row are staggered vertically with respect to the washers of the other two rows. The blades may be shaped like those described for the invention in its first form, and for the same reasons.

It will be noted that, while I have disclosed one method of mounting the fingers, characterized by a pivotal connection to the shaft, the essential principle of the invention is attainable in other constructions. For example, the arms may extend radially straight out from the shaft to the cylinder wall, the inner ends of the arms being mounted slidably in radially directed slots in the central shaft structure. The blades in that case will preferably be inclined rearwardly. In this construction, the arms will move outwardly when the motor is in operation and will scrape the film, but when compelled to move inwardly for an instant, may do so due to the radially slidably movable nature of their connection with the shaft structure.

Thus it will be seen that I have provided a confection freezer, adapted to freeze liquids by repeated application to a refrigerated surface, and repeated removal therefrom with intermediate beating, which efficiently scrapes frozen material from a refrigerated surface without chatter, and with almost complete elimination of vibration, due to the fact that the blades and their arms are held as a rigid whole in operative position by centrifugal force, but are held so retractably.

I claim:

1. In a device for freezing liquid material, the combination of: a cylinder having a smooth inner surface; means for cooling the cylinder along its inner surface below the freezing point of the liquid material; means for introducing the liquid material into the interior of the cylinder; a rotatable structure coaxially mounted within the cylinder; a motor for rotating the structure; a plurality of fingers each movably mounted in a similar manner on the rotatable structure for movement of its outer end outwardly toward and inwardly away from said inner surface; a first stop means on the rotatable structure limiting the outer movement of each finger when acted upon by centrifugal force generated by the movement of the rotatable structure to place the outer end of the finger in proximity with said surface; and a second stop means on the rotating structure limiting the inward movement of the finger when the structure is stationary to place the outer end substantially remote from said surface, the forwardly opening included angle between the advancing face of the outer end of each finger and a plane tangent to the cylinder at said outer end being not greater than a right angle, each finger lying in a plane perpendicular to the cylinder axis which is axially displaced from the similar planes in which lie other fingers.

2. The combination defined in claim 1, in which the fingers are of substantially non-resilient and rigid construction.

3. The combination defined in claim 2, in which the fingers are pivotally mounted on the rotating structure.

4. The combination defined in claim 3, in which the pivotal axis has the same direction as the axis of the rotating structure.

5. The combination defined in claim 4, in which the pivotal axis is parallel to and offset from the axis of the rotating structure.

6. The combination defined in claim 5, in which the fingers are arranged in a plurality of circumferentially spaced gangs, the fingers of each gang being rigidly secured to an associated bar pivotally mounted on the rotating structure to rotate on its axis with its axis parallel to the axis of the rotating structure and in which said first and second stop means are two stops associated with and arranged to engage each of the bars.

7. The combination defined in claim 5, in which the fingers are each pivotally mounted on the rotating structure for pivotal movement independently of the other fingers, and in which said first and second stop means comprise a plurality of pairs of stops, each pair being associated with and arranged to engage a corresponding one of said fingers.

8. The combination defined in claim 5, in which the rotating structure is provided with outwardly directed flat vertical faces arranged tangential to the surfaces of revolution of the rotating structure, and each finger has an enlarged inner end pivotally mounted on the rotating structure, and said end is provided with a flat surface outwardly opposite and closely adjacent an associated said vertical flat face and inwardly displaced from the pivotal axis of said enlarged end.

9. The combination defined in claim 3, in which the fingers extend both rearwardly tangentially and curvilinearly toward said cylindrical surface, the curvature thereof being convex in the direction of rotation.

10. The combination defined in claim 9, in which the fingers are provided with blades inclined to the cylindrical surface outwardly and rearwardly.

11. In a device for freezing liquid material, the combination of: a cylinder having a smooth inner surface; means for cooling the cylinder along its inner surface below the freezing point of the liquid material; means for introducing the liquid material into the interior of the cylinder; a rotatable structure coaxially mounted within the cylinder; a motor for rotating the structure; a plurality of fingers each movably mounted on the rotatable structure for movement of its outer end outwardly toward and inwardly away from said inner surface; and a distributor disk rigidly mounted on the rotating structure at the intake end thereof disposed to receive the liquid material from the said introducing means and throw it centrifugally outward against the inner surface of the cylinder in advance of said fingers.

ERNEST E. LINDSEY.

References Cited in the file of this patent

UNITED STATES PATENTS

| Number | Name | Date |
|---|---|---|
| 313,760 | Packer | Mar. 10, 1885 |
| 1,788,345 | Skirvin | Jan. 6, 1931 |
| 2,272,715 | Lindsey | Feb. 10, 1942 |